No. 807,514. PATENTED DEC. 19, 1905.
W. L. STOCKWELL.
FISH HOOK.
APPLICATION FILED MAY 17, 1905.

Witnesses
Frank R. Glow
H. C. Rodgers

Inventor
W<sup>m</sup> L. Stockwell
By George J. Thorpe
Atty.

UNITED STATES PATENT OFFICE.

WILLIAM L. STOCKWELL, OF McLOUTH, KANSAS, ASSIGNOR OF ONE-HALF TO JOSEPH K. BRADFORD, OF McLOUTH, KANSAS.

FISH-HOOK.

No. 807,514.         Specification of Letters Patent.         Patented Dec. 19, 1905.

Application filed May 17, 1905. Serial No. 260,893.

*To all whom it may concern:*

Be it known that I, WILLIAM L. STOCKWELL, a citizen of the United States, residing at McLouth, in the county of Jefferson and State of Kansas, have invented certain new and useful Improvements in Fish-Hooks, of which the following is a specification.

My invention relates to fish-hooks, and more especially of that character termed "weedless" hooks; and my object is to produce a hook which can be depended upon to invariably hold any fish which swallows the bait and attempts to pull it from the hook.

A further object is to produce a hook which can be swallowed readily by small or large fish.

To these ends the invention consists in its peculiar and novel construction and organization, as hereinafter described and claimed, and in order that it may be fully understood reference is to be had to the accompanying drawings, in which—

Figure 1:
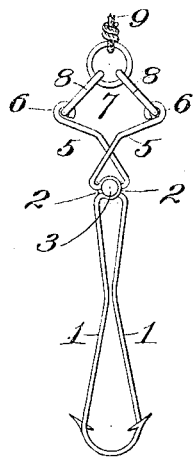
Figure 2:
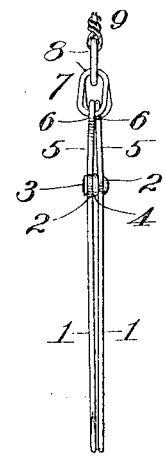
Figure 3:
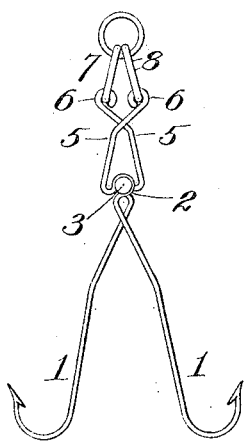
Figure 4:
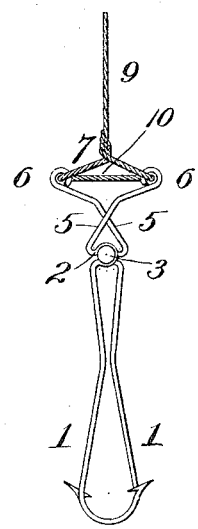

Figure 1 is a side view of a hook as adjusted when baited, the bait being omitted. Fig. 2 is an edge view of the same. Fig. 3 is a side view of the hook in one of the positions it assumes when a fish is hooked thereon. Fig. 4 is a side view of the hook as shown in Fig. 1, but with a modified form of flexible connection between the arms of the hook.

In the construction of the hook two pieces of steel of the kind usually employed in making fish-hooks are bent to form two similar hook members 1 1, preferably, but not necessarily, barbed at their lower ends. These hooks are disposed in opposite directions and at their upper ends are bent to form oppositely-projecting eyes 2, which are arranged in alinement and engage the pivot 3, having its ends upset or riveted to hold said eyes thereon, the eyes being separated, preferably by a small washer 4 upon the pivot. Projecting from said eyes in opposite directions, so as to cross, are arms 5, terminating in eyes 6, which eyes when the hook-terminals occupy the position shown in Figs. 1 and 4 are disposed a considerable distance apart and at the same side of the vertical plane of the pivot as their respective hook-terminals.

It will be noticed that the arms of the hooks are crossed above the pivot, so that a strong leverage is obtained without requiring a lengthy arm. The washer holds the hooks slightly separated, so as to overcome the liability of the barbs engaging and interlocking if the hooks should be bent or should be moved too far in the closing action. It will be further observed that the eyes 2 are not closed circles, but are bights. This construction while strong enough to retain the hook on the pivot imparts a slight spring action to the same in impaling a fish and also facilitates the removal of a broken hook from the pivot-pin, as the eye may be shifted laterally and the mouth of the bight forced open over the pin. The new hook may obviously be fitted over the pivot in a similar manner. In the case of a hook having a closed circular eye, however, the end of the pivot-pin must be reduced to permit the broken hook to be removed thereover and upset again when the new hook has been slipped thereon.

7 indicates a flexible connection between said eyes 6, the connection shown in Fig. 1 being in the form of a short chain, consisting of links 8, the central link being attached to the end of the fish-line, as at 9. In Fig. 4 in lieu of the flexible connection in the form of a chain the eyes may be connected by a loop 10 at the lower end of the fishing-line, or any other suitable connection may be employed, it being desirable, of course, that the line shall be attached to said connection about midway its length.

To bait the hook, it is opened as shown in Fig. 3, each hook member preferably receiving a worm or other bait. The hook is then restored to its original position, as shown in Figs. 1 and 4, and dropped into the water. With the hook in such position it is obvious that a small or large fish can swallow it with equal facility and that as this action takes place and the fisherman becomes aware that he has a "bite" he pulls upon the line, this action resulting through the flexible connection between eyes 6 in drawing the arms 5 of the hook members inward or toward the position shown in Fig. 3, and thereby forcing the hook ends of said members outward and impaling the fish thereon. The action in practice is so reliable that the tug of the fish on the line is sufficient to cause the hook members to swing toward the position shown in Fig. 3 and effect the impalement, and it will be obvious that once hooked the harder he pulls the more reliably he will be secured.

If the hook is not provided with barbs, it will be necessary to keep the line under tension when the fish is on the hook; but if barbed the line may be handled in the manner customary with barbed hooks.

In ordinary fishing the barbless hooks will be found of great advantage in that when the fish is once landed he can be removed from the hook easily and quickly and without lacerating or cutting him, as is frequently necessary in removing a fish from a barbed hook.

It is obvious that with the barbs covered by the bait and with the loop or open space of one hook member closed by the shank of the other it will be an exceedingly rare occurrence when the hook will catch so tightly on a snag that it cannot be disengaged with but little trouble, and this is particularly so where the loop formed by the two hook members is bridged or closed by the bait thereon. With the hook as shown the barbs project such a slight distance that they cannot be embedded so deeply into a snag that they cannot be easily jerked loose.

From the above description it will be apparent that I have produced a fish-hook embodying the features of advantage enumerated as desirable and which obviously may be modified as regards its form, proportion, detail construction, and arrangement of the parts without departing from the principle of construction involved.

Having thus described the invention, what I claim as new, and desire to secure by Letters Patent, is—

1. A fish-hook comprising a pair of oppositely-disposed hook members formed at intermediate points of their lengths with integral open bights and having their upper portions crossed above said bights, a flexible connection between the upper extremities of the crossed portions and a pivot-pin extending through the open bights of the hook members.

2. A fish-hook comprising a pair of oppositely-disposed hook members formed at a suitable point with eyes, and provided above said eyes with crossed arms terminating at their upper ends in eyes, a pivot engaged by the first-named eyes and provided with headed ends, a washer on said pivot between said eyes, and a flexible connection connecting the eyes of said arms, in combination with a line attached to said connection about midway its length.

In testimony whereof I affix my signature in the presence of two witnesses.

WILLIAM L. STOCKWELL.

Witnesses:
ANNIE M. STEEPER,
ALBERTA C. DICKERSON.